(12) United States Patent
Le et al.

(10) Patent No.: US 9,117,063 B2
(45) Date of Patent: Aug. 25, 2015

(54) SESSION MANAGER FOR SECURED REMOTE COMPUTING

(75) Inventors: Bach H. Le, San Jose, CA (US); Oleg Rombakh, Santa Clara, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 2596 days.

(21) Appl. No.: 10/787,227

(22) Filed: Feb. 27, 2004

(65) Prior Publication Data
US 2005/0193118 A1    Sep. 1, 2005

(51) Int. Cl.
G06F 15/16 (2006.01)
G06F 7/04 (2006.01)
A63F 9/24 (2006.01)
G06F 15/177 (2006.01)
H04W 4/00 (2009.01)
G06F 1/00 (2006.01)
G06F 21/31 (2013.01)

(52) U.S. Cl.
CPC ...................................... *G06F 21/31* (2013.01)

(58) Field of Classification Search
CPC ................. G06F 21/31; G06F 1/3231; G06F 2221/2147; H04N 21/44218; H04W 88/06; H04W 12/02; H04W 64/00; H04W 4/023; H04L 63/08; H04L 67/18
USPC ........................................................ 709/227
See application file for complete search history.

(56) References Cited

U.S. PATENT DOCUMENTS

| | | | |
|---|---|---|---|
| 6,065,120 A * | 5/2000 | Laursen et al. | 726/5 |
| 6,145,083 A * | 11/2000 | Shaffer et al. | 726/7 |
| 6,244,957 B1 * | 6/2001 | Walker et al. | 463/20 |
| 6,480,894 B1 * | 11/2002 | Courts et al. | 709/227 |
| 6,854,009 B1 * | 2/2005 | Hughes | 709/220 |
| 6,876,644 B1 * | 4/2005 | Hsu et al. | 370/338 |
| 7,069,444 B2 * | 6/2006 | Lowensohn et al. | 713/185 |
| 7,089,508 B1 * | 8/2006 | Wright | 715/867 |
| 7,219,233 B1 * | 5/2007 | Hendriks et al. | 713/182 |
| 2005/0080915 A1 * | 4/2005 | Shoemaker et al. | 709/231 |
| 2007/0208992 A1 * | 9/2007 | Koren | 715/503 |

* cited by examiner

Primary Examiner — Phuoc Nguyen
Assistant Examiner — Kishin G Belani
(74) Attorney, Agent, or Firm — Baker Botts L.L.P.

(57) ABSTRACT

A method for managing a session between a local computing device and a remote computing device, in which a session is established between a local computing device and a remote computing device, a lock session signal is transmitted from the remote computing device to the local computing device, a lock session signal is received at the local computing device, and the session is locked, at the local computing device. Furthermore, the user is prompted for identification information at the remote computing device, and the identification information is transmitted from the remote computing device to the local computing device. Moreover, the identification information is received at the local computing device, the identification information is authenticated at the local computing device, and the session is unlocked, at the local computing device.

20 Claims, 3 Drawing Sheets

SESSION MANAGER FOR SECURED REMOTE COMPUTING

FIELD OF THE INVENTION

The present invention relates generally to the field of computer networking and, more particularly, relates to secured remote computing using a session manager.

DESCRIPTION OF THE RELATED ART

In recent years, there have been two competing philosophies regarding the design and implementation of computer networks, particularly with regard to the development of client/server applications. Under one philosophy, spearheaded by the Microsoft® and Intel® corporations, client-side applications are large, requiring the bulk of the data processing to occur at the desktop. This type of network setup requires client devices run robust operating systems, such as any one of the Microsoft® Windows® desktop operating systems, where the client device includes significant amounts of memory, a large hard disk drive, and a speedy processor. While these client devices, euphemistically known as "fat" clients, may have strong processing abilities, fat clients have high initial and maintenance costs, and may offer redundant processing capabilities if idled.

Under the second competing philosophy, spearheaded by the Wyse®, Netscape®, and Sun Microsystems® corporations, the client application and client device are designed so that the majority of data processing occurs at a local computing device, such as a centralized server. These client devices, referred to as "thin" clients, generally have minimal memory, disk storage, and processor power, but are designed under the premise that most users connected to a powerful server via a network do not need the processing power of a fat client. With thin clients, the total cost of ownership ("TCO") is minimized, because the devices are less expensive to purchase than fat clients, and because thin clients can be centrally administered and updated from the server. As such, thin clients are especially suited for a network which requires a significant number of workstations.

While thin clients applications were first associated with simple diskless workstations or "dummy terminals," newer applications have been developed to work on a large number of operating systems or remote devices. For instance, the Microsoft® Windows® CE or Microsoft® Windows® XP embedded operating systems can be used in non-personal computer devices, such as cash registers, automated teller machines (ATMs), industrial controllers, gateways, Internet Protocol (IP) telephones, server appliances, Windows-based thin clients, advanced consumer electronics, and specialized handheld devices.

Frequently, thin clients are pooled so that the device is shared amongst a large number of users. For example, in a data entry facility or on a factory floor, multiple users may periodically use a single thin client to enter or check data, or to update a status of a manufactured component or piece of machinery. In any situation where you have multiple users using one shared computing device, information security becomes a particular problem.

The typical way for a user of a remote computing device such as a thin client to keep their data secure or to safeguard a secured session is through the use of a password, and, in particular, by logging onto the device using a unique user identification and a secret password. By logging in, the local computing device and the remote computing device establish a session, where data can be transferred to and from the local computing device, and viewed or changed only by the authorized user. When the user is finished accessing the data, the user would generally "log off" or terminate the session, so that subsequent users would not be able to view or change that user's personal data.

This conventional method for maintaining session security is often inefficient, given the complexities of human nature and the unique work conditions of many thin clients or other remote computing devices. In many instances, users may unintentionally leave the remote computing device unattended for long periods of time, or fail to log off completely, allowing subsequent users the opportunity to view and change data accessible through the connected session. Furthermore, users may view the logging on and logging off process as an unnecessary hassle or chore, and voluntarily share passwords or connected sessions with other users.

The chief method of circumventing this problem is through the use of a software application such as a screen saver, stored on the remote computing device. A screen saver is generally activated upon the occurrence of a triggering event, such as the lapse of a predetermined amount of time without a keystroke or mouse movement. When the screen saver activates, the display device normally displays a picture or animation. A user who attempts to use the remote computing device after the screen saver program activates and locks the local computer from access is asked to supply an authenticating password to gain access to the computer. If the password entered does not match a password stored on the device, the user is prevented from using the device.

Applications such as screen savers add a layer of security to remote computing devices by blocking access to a particular terminal if the original user has logged on to the computer, but fails to log off. Since the screen saver is a local application, however, the password to reactivate the computer will be the same for all users. Additionally, although screen saver programs block use of the computer by locking access to the computer, screen saver programs do not affect or alter the underlying connected session between the remote computing device and the local computing device. In this regard, if a user creates a session on a computer and then fails to log off, any authorized user in the vicinity could use the local client screen saver password to disable the screen saver, and access the connected session.

Accordingly, it is desirable to provide a session manager to overcome the drawbacks associated with conventional secured session managers. Additionally, it is desirable to provide a session manager which is specifically tailored to manage a secured session by communicating authentication data and locking operations between a local computing device such as a server and a remote computing device.

SUMMARY OF THE INVENTION

It is an object of the invention to address disadvantages found in conventional session managers, particularly with regard to those disadvantages which relate managing secured sessions with remote computing devices.

In one aspect of the present invention, a secured session between a local computing device, such as a Microsoft® Windows® server, and a remote computing device, such as a thin client device, is managed by establishing a session between the local computing device and the remote computing device, and locking the session upon the receipt of a lock session signal as a result of receiving a signal from a remote computer. Identification information is received and authenticated, and the session is unlocked between the local computing device and the remote computing device.

Locking a session at the local computing device, such as a server, has several unique advantages over the techniques used in conventional session managers. Specifically, by dispensing with shared local passwords, such as screen saver passwords, the session manager of the present invention increases the likelihood that the user of a session is an authorized user who has the appropriate password to establish or unlock a session. Furthermore, by triggering the session lock based upon a lock session signal received from a remote computing device, session lock intervals can be configured or adjusted based upon criteria which may be set at each remote computing device.

In a preferred aspect of the invention, the session is established on a first communication channel, and the lock session signal and the identification information are transmitted on a second communication channel. In a further preferred aspect, the second communication channel is a Citrix® Independent Computing Architecture™ (ICA) Virtual Channel.

By splitting communication between a local computing device and a remote computing device into two discrete communication channels, the local computing device can lock or suspend all communication occurring through the first channel, while maintaining diagnostic control on the second communication channel, increasing security and flexibility. Furthermore by using an ICA Virtual Channel, communication with the local computing device will occur on a bi-directional, error-free connection, to ensure the expeditious exchange of generalized packet data.

The invention also contemplates managing a secured session between a local computing device and a remote computing device by establishing a session between a local computing device and a remote computing device, and transmitting a lock session signal from the remote computing device to the local computing device. The lock session signal is received at the local computing device, the local computing device locks the session, and a user is prompted for identification information at the remote computing device. The identification information is transmitted from the remote computing device to the local computing device, and the local computing device receives the identification information, authenticates the identification information, and unlocks the session.

By locking the session between the local computing device and the remote computing device, the session manager of the present invention requires that the user of a particular session establish the session using an authorized password, and then periodically re-enter authenticating data, increasing information security. In this regard there will be both a local lock at the remote computer, and a session lock at the local computing device. Additionally, different remote computing devices may be configured to trigger the session lock on different intervals or upon various predetermined events, increasing flexibility and optimizing the security of each terminal based upon locally determined parameters.

In a preferred aspect of the invention, the session is established on a first communication channel, and the lock session signal and the identification information are transmitted on a second communication channel. In a further preferred aspect, the second communication channel is a Citrix® ICA Virtual Channel.

In an additional preferred aspect, the lock session signal is transmitted upon the occurrence of a predetermined event, where the predetermined event is a lapse of a predetermined amount of time or an activation of a screen saver. Specifically, upon the activation of a screensaver or other predetermined event, the lock session signal is transmitted from the remote computing device to the local computing device, such as a Citrix® MetaFrame™ server.

In yet another preferred aspect, the local computing device is a Citrix® MetaFrame™ server, and the remote computing device is a Citrix® ICA client, a personal computer, a cash register, an ATM, an industrial controller, a gateway, an IP telephone, a server appliance, a thin client, a PDA or a cellular telephone.

The present invention further contemplates an information processing system for managing a secured session, including a local computing device for locking and unlocking a session, and for authenticating identification information. The information processing system further includes a remote computing device for transmitting a lock session signal to the local computing device, prompting a user for identification information, and transmitting the identification information to the local computing device.

In a preferred aspect of the invention, the session is established on a first communication channel, and the lock session signal and the identification information are transmitted on a second communication channel. In a further preferred aspect, the second communication channel is a Citrix® ICA Virtual Channel.

In an alternate aspect of the invention, an established, secured session is managed on a remote computing device by transmitting a lock session signal from the remote computing device, prompting a user for identification information at the remote computing device, and transmitting the identification information from the remote computing device.

In an additional preferred aspect of the invention, the session is established on a first communication channel, and the lock session signal and the identification information are transmitted on a second communication channel. In a further preferred aspect, the second communication channel is a Citrix® ICA Virtual Channel.

This brief summary has been provided so that the nature of the invention may be understood quickly. A more complete understanding of the invention can be obtained by reference to the following detailed description of the preferred embodiments thereof in connection with the attached drawings. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout.

DETAILED DESCRIPTION OF THE INVENTION

Figure 1:
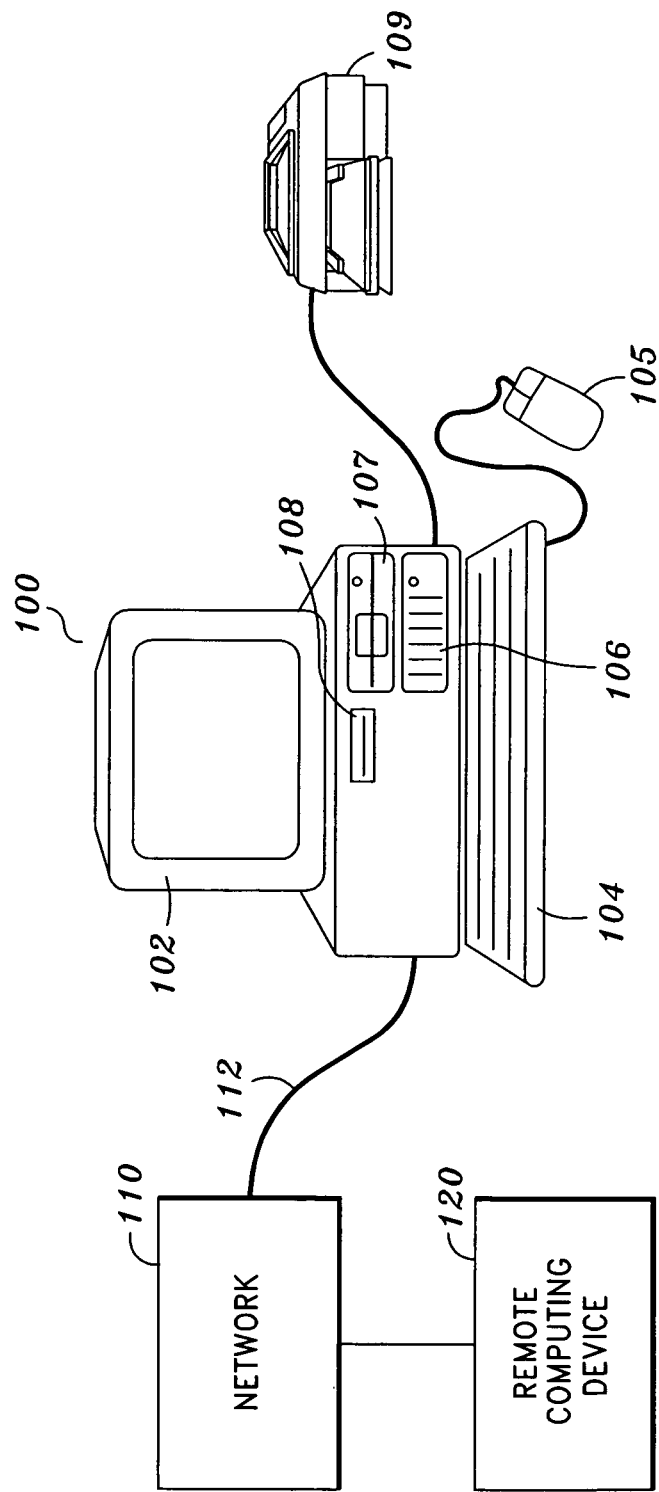
FIG. 1 depicts the exterior appearance of one embodiment of the invention.

FIG. 1 is a view showing the exterior appearance of one embodiment of the invention. Computer 100 is a local computing device such as a server, where computer 100 includes computer-readable storage medium, such as fixed disk drive 106, for the management of a secured session. As shown in FIG. 1, the hardware environment can include computer 100, display monitor 102 for displaying text and images to a user, keyboard 104 for entering text data and user commands into computer 100, mouse 105 for pointing, selecting and manipulating objects displayed on display monitor 102, fixed disk drive 106, removable disk drive 107, tape drive 108, hardcopy output device 109, computer network 110, computer network connection 112, and remote computing device 120.

Computer 100 can be a desktop PC, a laptop, a workstation, a midrange computer, or a mainframe without departing from the scope of the present invention. Display monitor 102 displays the graphics, images, and texts that comprise the user interface for the application of the present invention as well as the operating system programs necessary to operate the computer. An operator of computer 100 uses keyboard 104 to enter commands and data to operate and control the computer operating system programs as well as the application programs. The operator uses mouse 105 to select and manipulate graphics and text objects displayed on display monitor 102 as part of the interaction with and control of computer 100 and applications running on the computer. Mouse 105 can be any type of pointing device, including a joystick, a trackball, or a touch-pad without departing from the scope of the present invention.

The session manager for secured remote computing is stored locally on computer readable memory media such as fixed disk drive 106. Fixed disk drive 106 can comprise a number of physical drive units, such as a redundant array of independent disks ("RAID") without departing from the scope of the present invention. Fixed disk drive 106 can also be a disk drive farm or a disk array that can be physically located in a separate computing unit without departing from the scope of the present invention. Such computer readable memory media allow computer 100 to access information such as session manager application data, computer-executable process steps, application programs and the like, stored on removable and non-removable memory media.

Network connection 112 can be a modem connection, a local-area network ("LAN") connection including the Ethernet, and a broadband wide-area network ("WAN") connection including digital subscriber line ("DSL"), Cable, T1, T3, Fiber Optics, and Satellite connection without departing from the scope of the present invention. Network 110 can be a LAN network, a corporate WAN network, or the Internet without departing from the scope of the present invention.

Removable disk drive 107 is a removable storage device that can be used to off-load data from computer 100 or upload data onto computer 100. Without departing from the scope of the present invention, removable disk drive 107 can be a floppy disk drive, an Iomega® Zip® drive, a compact disk-read only memory ("CD-ROM") drive, a CD-Recordable drive (CD-R), a CD-Rewritable drive (CD-RW), a DVD-ROM drive, flash memory, a Universal Serial Bus (USB) flash drive, pen drive, key drive, or any one of the various recordable or rewritable digital versatile disk ("DVD") drives such as the DVD-R, DVD-RW, DVD-RAM, DVD+R, or DVD+RW. Operating system programs, applications, and various data files are stored on disks. The files can be stored on fixed disk drive 106 or on a removable media for removable disk drive 107 without departing from the scope of the present invention.

Tape drive 108 is a tape storage device that can be used to off-load data from computer 100 or upload data onto computer 100. Tape drive 108 can be quarter-inch cartridge ("QIC"), 4 mm digital audio tape ("DAT"), or 8 mm digital linear tape ("DLT") drive without departing from the scope of the present invention.

Hardcopy output device 109 provides an output function for the operating system programs and applications including the session manager for secured remote computing. Hardcopy output device 109 can be a printer or any output device that produces tangible output objects, including patient information and action item reports, without departing from the scope of the present invention. While hardcopy output device 109 is shown as being directly connected to computer 100, it need not be. Hardcopy output device 109 may be connected via a network (e.g., wired or wireless network, not shown), for example.

While the session manager for secured remote computing runs locally on computer 100, which is used as a local computing device or a server, data is sent to computer 100 via network 110 and network connection 112, from remote computing device 120. Remote computing device 120 is a personal computer, a cash register, an automated teller machine ("ATM"), an industrial controller, a gateway, an internet protocol ("IP") telephone, a server appliance, a thin client, a personal digital assistant ("PDA"), or a cellular telephone. Moreover, remote computing device 120 can comprise multiple remote computing devices without departing from the scope of the present invention.

Figure 2:
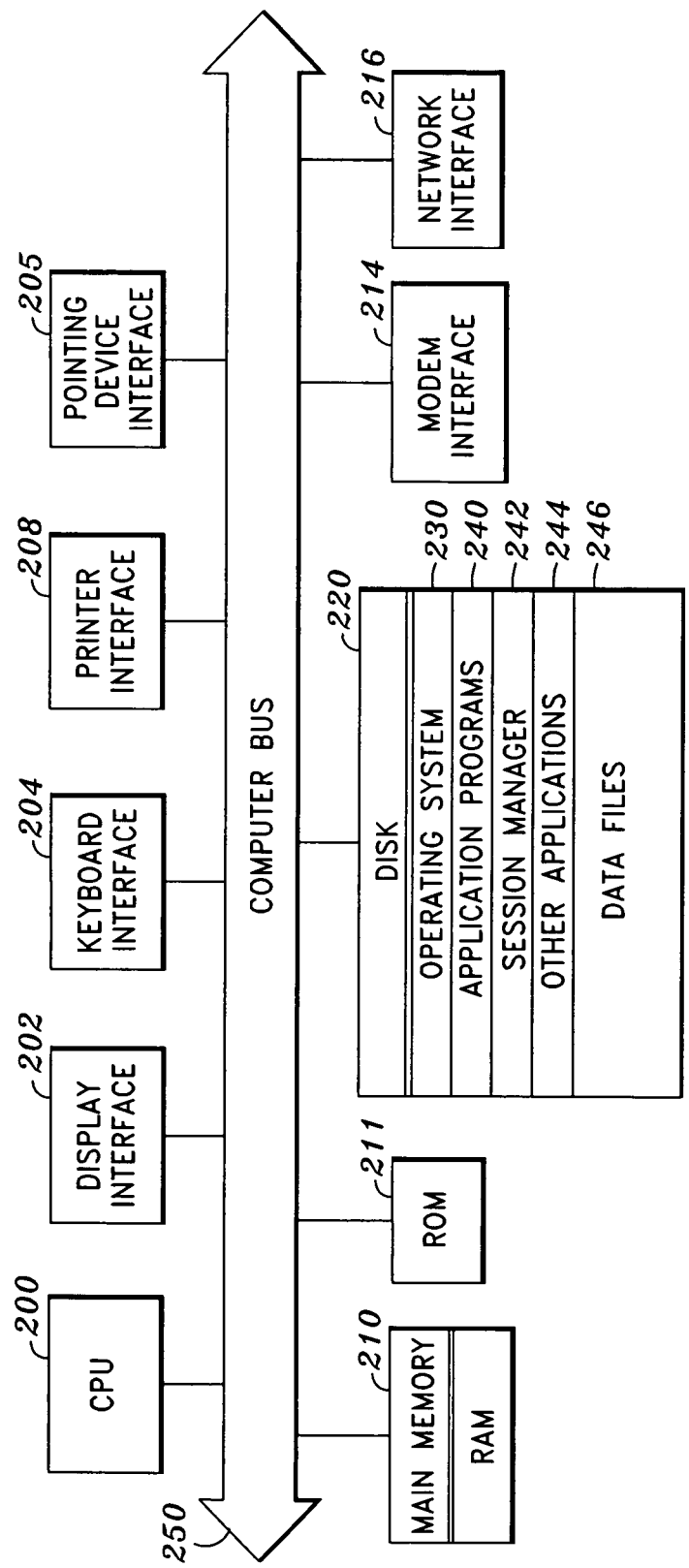
FIG. 2 depicts an example of an internal architecture of the FIG. 1 embodiment.

FIG. 2 is a detailed block diagram showing the internal architecture of computer 100. As shown in FIG. 2, the computing environment can include: central processing unit ("CPU") 200 where the computer instructions that comprise an operating system or an application, including the session manager, are processed; display interface 202 which provides communication interface and processing functions for rendering graphics, images, and texts on display monitor 102; keyboard interface 204 which provides a communication interface to keyboard 104; pointing device interface 205 which provides a communication interface to mouse 105 or an equivalent pointing device; printer interface 209 which provides a communication interface to hardcopy output device 109; random access memory ("RAM") 210 where computer instructions and data can be stored in a volatile memory device for processing by CPU 200; read-only memory ("ROM") 211 where invariant low-level systems code or data for basic system functions such as basic input and output (I/O), startup, or reception of keystrokes from keyboard 104 are stored in a non-volatile memory device; disk 220 which can comprise fixed disk drive 106 and removable disk drive 107, where the files that comprise operating system 230, application programs 240 (including session manager 242 and other applications 244) and data files 246 are stored; modem interface 214 which provides a communication interface to computer network 116 over a modem connection; and computer network interface 216 which provides a communication interface to computer network 116 over a computer network connection. The constituent devices and CPU 200 communicate with each other over computer bus 250.

RAM 210 interfaces with computer bus 250 so as to provide quick RAM storage to CPU 200 during execution of software programs such as the operating system application programs, and device drivers. More specifically, CPU 200 loads computer-executable process steps from fixed disk drive 106 or other memory media into a region of RAM 210 in order to execute software programs. Data, including data relating to managed sessions, can be stored in RAM 210, where the data can be accessed by CPU 200 during execution.

Also shown in FIG. 2, disk 220 stores computer-executable code for a windowing operating system 230, application programs 240 such as word processing, spreadsheet, presentation, graphics, image processing, gaming, etc. applications. Disk 220 also stores the session manager for secure remote computing 242. The management of sessions between a local computing device and a remote computer is preferably implemented as shown, however it is also possible to implement the session manager according to the invention as a dynamic link library ("DLL"), or as a plug-in to other application programs such as an Internet web-browser such as the Microsoft Internet Explorer® web browser.

CPU 200 can be any of the high-performance CPUs, including an Intel CPU, a PowerPC CPU, a MIPS RISC CPU, a SPARC CPU, a Alpha CPU or a proprietary CPU for a mainframe, without departing from the scope of the present invention. CPU 200 in computer 100 can comprise more than one processing units, including a multiple CPU configuration found in high-performance workstations and server, or a multiple scalable processing units found in mainframes.

Operating system 230 can be: Windows NT/2000/XP Workstation; Windows NT/2000/XP Server; a variety of Unix-flavor operating systems, including AIX for IBM workstations and servers, SunOS for Sun workstations and servers, Linux for Intel CPU-based workstations and servers, HP-UX for HP workstations and servers, Irix for SGI workstations and servers, VAX/VMS for DEC computers, OpenVMS for Alpha-based computers, Mac OS X for PowerPC based workstations and servers; or a proprietary operating system for mainframe computers. If the local computing device is using Citrix® MetaFrame™, operating system 230 is a Microsoft® Windows® 2000/XP operating system.

FIGS. 1 and 2 illustrate a preferred embodiment of a computing system that executes program code, or program or process steps, configured to manage a secured session. Other types of computing systems may also be used as well.

Figure 3:
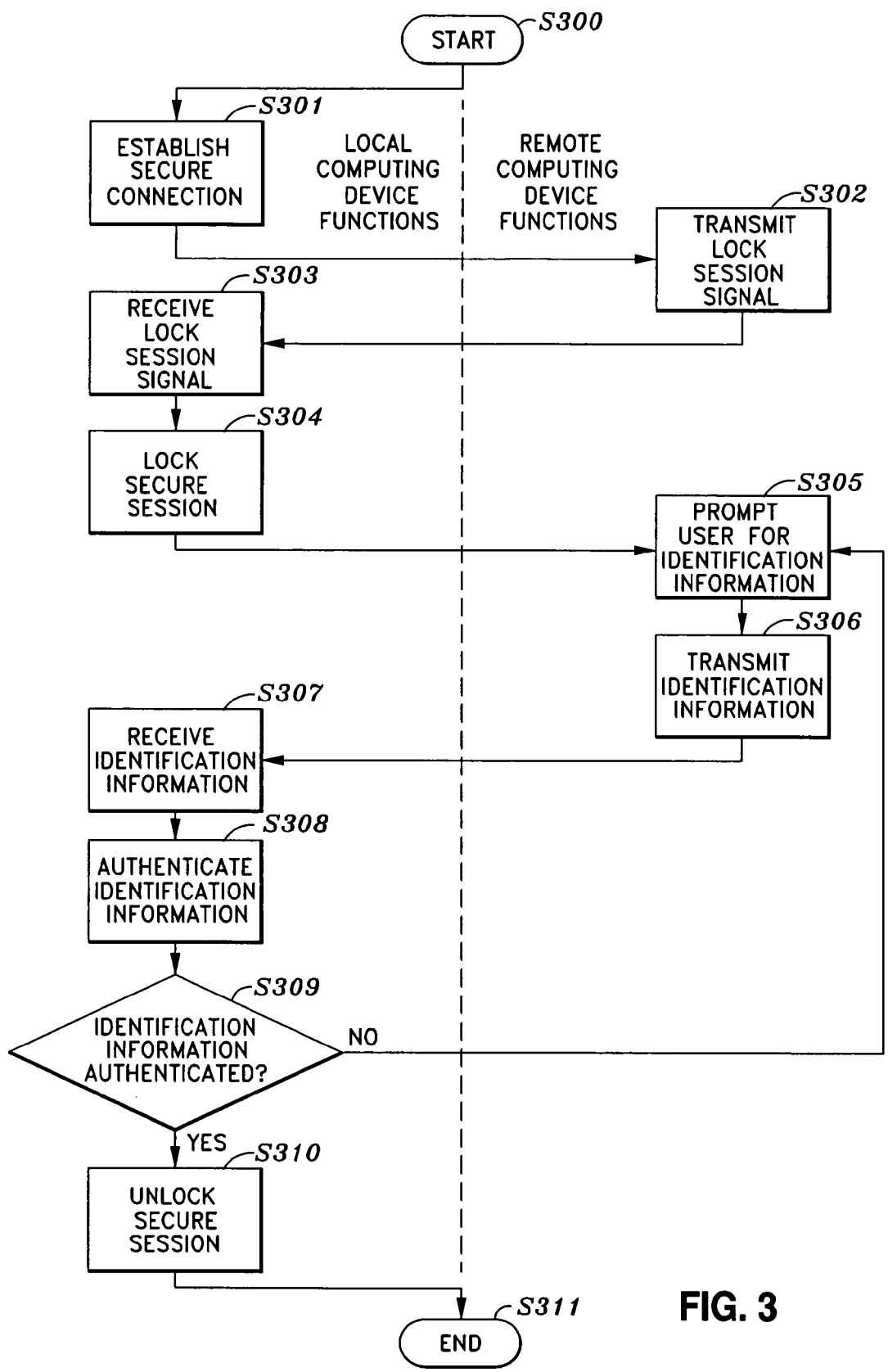
FIG. 3 is a flow chart depicting the process for managing a secured session between a local computing device and a remote computing device.

FIG. 3 illustrates a flowchart in accordance with the present invention. Briefly, according to FIG. 3, a session is established between a local computing device and a remote computing device, a lock session signal is transmitted from the remote computing device to the local computing device, the lock session signal is received at the local computing device, and the local computing device locks the session. Furthermore, the user is prompted for identification information at the remote computing device, the identification information is transmitted from the remote computing device to the local computing device, and the local computing device receives the identification information and authenticates the identification information. If the identification information is authenticated, the local computing device unlocks the session.

Upon starting (step S301), the local computing device establishes a session. The session is established between a local computing device and a remote computing device (step S301) on a first communication channel.

The technique of establishing a session between a local computing device and a remote computing device is well known in the art. Typically, a session is established when a user of the remote computing device logs in to a local computing device, by entering personally identifying information, such as a user name and a password, or by entering information which identifies the remote computing device. The establishment of the session may be manual, in which data must be entered by the user of the remote computing device, or automatic, in which the logon occurs seamlessly without input by the user at the time of system power-up.

Upon the occurrence of a predetermined event, the remote computing device sends a lock session signal to the local computing device (step S302). The lock session signal is sent on a second communication channel, which is an ICA Virtual Channel. The predetermined event which triggers the transmission of the lock session signal is the activation of a screen saver.

Typical screen saver programs are well known in the art. Screen savers are small programs which take over the display screen if there are no keystrokes or mouse movements for a specified duration. While, as the name implies, screen savers were originally developed to prevent ghosting, which is the permanent etching of a pattern on a display screen, modem display screens do not typically suffer from this problem. Screen savers today are mostly an adornment, and are used to "liven up" a computer, and are often used to hide a user's work from snoopers. As such, screen savers fill the display with an image or animation until the user enters a password, which is stored locally on the remote computing device.

In addition to merely taking over the screen, the screen saver application used in the present invention triggers the transmission of the lock session signal to the local computing device.

Since it is an object of the present invention to lock a session before an unauthorized user accesses a secured session, the activation of a screen saver provides an appropriate indication that an authorized user is no longer in control of the remote computing device. Specifically, screen savers activate when a period of time has elapsed without manual input to the remote computing device, as is the case where an authorized user has logged in, and then stepped away from the remote computing device for an extended period of time.

Further to this objective, however, alternative aspects of the invention use different predetermined events to trigger the transmission of the lock session signal. In particular, the predetermined event could be a simple timeout, forcing the user to re-login at specified time intervals, or the predetermined event could be the execution of a new software application. More complex systems are also contemplated by the present invention to detect the departure of an authorized user, including motion detectors, the presence or absence of dedicated short range communication ("DSRC") identification devices such as radio frequency identification ("RFID") transceivers or other digital tags, altered biometric data of the user, or software which uses artificial intelligence to examine the input or writing style of a user to determine if the user may have changed since logging on. All of these techniques are within the scope of the present invention.

One instance where a screen saver trigger is particularly useful is when a local thin client device is connected to a Citrix® MetaFrame™ server. Briefly, Citrix® MetaFrame™ allows a user to run applications on a server from anywhere in the world, via a network. When applications are run, screen shots are sent to the remote computing device, and, in return, keyboard input and mouse movements are sent to the Citrix® MetaFrame™ server. Since the server does most of the application processing, a thin client can be used to operate software which is otherwise too computationally expensive to be executed on the thin client.

Once a Citrix® MetaFrame™ session has been established, the screen saver at the thin client may activate, filling the display with an image or animation until the user moves the mouse or presses a key on the keyboard, and enters a password which is stored locally on the remote computing device. With conventional thin clients, the screen saver activation would not affect the secured session, so that a person who knows the general screen saver password can disable the screen saver and still have access to a secured session for a user who may have long since departed.

Using the present invention, however, once the screen saver activates, the thin client sends the lock session signal to the local computing device, where the local computing device processes the bulk of the session management. This method allows session management operation to be triggered locally using a simple application at the thin client, but executed at a centralized local computing device, where complex computer operations can be performed most expeditiously.

By splitting communication between a local computing device and a remote computing device into two discrete communication channels, the local computing device can lock or suspend all communication occurring through the first channel, while maintaining diagnostic control on the second communication channel. Furthermore by using an ICA Virtual Channel, communication with the local computing device will occur on a bi-directional, error-free connection, to ensure the expeditious exchange of generalized packet data.

In an alternate aspect of the invention, the lock session signal is sent on the first communication channel.

The local computing device receives the lock session signal (step S303), and locks the session (step S304). By "locking" the session, the local computing device does not accept any further input, including keystrokes or mouse movements from the remote computing device until the user unlocks the session. The secured session with the remote computing device is maintained, and all applications running on the local computing device continue to execute. Applications which are executing on the local computing device are not necessarily notified of the locked state of the secured session, and continue to process.

Locking a session at the local computing device has several unique advantages over the techniques used in conventional session managers. Specifically, by dispensing with shared local passwords, such as screen saver passwords, the session manager of the present invention increases the likelihood that the user of a session is an authorized user who has the appropriate password to establish or unlock a session. Furthermore, by triggering the session lock of the session based upon a lock session signal, received from a remote computing device, session lock intervals can be configured or adjusted based upon criteria which may be set at each remote computing device.

At the remote computing device, the user is prompted to enter identification information (step S305). Identification information relating to a secured session is typically a username and a password, but in alternate aspects the identification information is biometric data, or data relating to physical features of the user such as a fingerprint, iris scan, or voice sample. It is important to note that the identification information is unique to the established session, and may be supplemental to additional password information required to re-activate the local computer. Specifically, the user may be prompted to enter a local screen saver password in order to disable a screen saver, and additionally prompted to enter the identification information relating to the established (but locked) session.

Identification information is entered using a session lock Graphical Identification And Authorization (GINA), as an interface for the validation of logon credentials.

In an alternate aspect, both the screen saver and the session lock may be disabled at the same time by entering and validating the identification information.

The remote computing device transmits the identification information to the local computing device (step S306) on a second communication channel. The transmission of data packets across a network is well known in the art.

In an alternate aspect of the present invention, the identification information is transmitted on the first communication channel.

The local computing device receives the identification information (step S307), and authenticates the identification information (step S308). The identification information is authenticated by comparing the received identification information to a table of identification information for authorized users, where the table is stored on the local computing device.

For example, in the case where the identification information includes a username and a password, the local computing device would compare the username with a list of authorized users, and, if the username is authorized, compare the input password with the password stored on the local computing device. If the user is authorized to access the remote computing device, and if the input password matches the stored password, the identification information is authenticated. If, however, the user is not authorized to access the remote computing device, or if the input password does not match the stored password, the identification is not deemed authenticated.

By authenticating identification information and managing the session at the local computing device, session management according to the present invention is particularly well suited for networks which include thin clients, or devices such as cash registers, ATMs, industrial controllers, gateways, IP telephones, server appliances, PDAs, or cellular telephones. Specifically, these devices have minimal memory, disk storage, and processor power, so by moving the majority of the processing to the local computing device, valuable computational resources are freed for other tasks. Furthermore, since these thin clients or other devices are often pooled or shared, the session manager according to the present invention is able to improves information security for devices which frequently switch hands or change users.

In addition to these advantages, on a network which may have large numbers of workstations or connected devices, a user does not need to remember local passwords or identification information for each device connected to the network, but rather can remember only one set of identification information to maintain information security throughout the entire network. This type of system encourages users to safeguard their own password, and not share passwords to pooled devices with other users.

If the identification information is authenticated (step S309), the session is unlocked (step S310), and the process ends.

If the identification information cannot be authenticated (step S309), the session is not unlocked until the user enters the correct identification information at the user prompt, on the remote computing device (step S305).

As described above, the management of the session between a local computing device and a remote computing device has two components, a local computing device component and a remote computing device component.

On the local computing device side, the invention further contemplates a method for managing a session, including the steps of establishing a session (step S301), receiving a lock session signal (step S303), locking the session upon receipt of the lock session signal (step S304), receiving identification information (step S307), authenticating the identification information (steps S308 and S309), and unlocking the session (step S310). The session is established on a first communication channel, and the lock session signal and the identification information are transmitted on a second communication channel, which is a Citrix® ICA Virtual Channel. In a further preferred embodiment, the lock session signal and the identification information are transmitted on the first communication channel.

By locking the session between the local computing device and the remote computing device, the session manager of the present invention requires that the user of a particular session establish the session using an authorized password, and then periodically re-enter authenticating data, increasing information security. Additionally, different remote computing device may be configured to trigger the session lock on different intervals or upon various predetermined events, increasing flexibility and optimizing the security of each terminal based upon locally determined parameters.

Moreover, on the remote computing device side, the invention further contemplates a method for managing an established session on a remote computing device, including the steps of transmitting a lock session signal from a remote computing device (step S302), prompting a user for identification information at the remote computing device (step S305), and transmitting the identification information from the remote computing device (step S306).

The session is established on a first communication channel, and the lock session signal and the identification information are transmitted on a second communication channel, which is a Citrix® ICA Virtual Channel. In a further preferred embodiment, the lock session signal and the identification information are transmitted on the first communication channel.

In an additional preferred aspect, the lock session signal is transmitted upon the occurrence of a predetermined event, where the predetermined event is a lapse of a predetermined amount of time or an activation of a screen saver.

In yet another preferred aspect, the local computing device is a Citrix® MetaFrame™ server, and the remote computing device is a Citrix® ICA client, a personal computer, a cash register, an ATM, an industrial controller, a gateway, an IP telephone, a server appliance, a thin client, a PDA or a cellular telephone.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A computing device for communicating with another computing device that is remote to the computing device, the computing device comprising:
    a non-transitory computer-readable medium or media encoded with instructions to allow the computing device to perform the following tasks:
        facilitating transmitting upon an occurrence of a predetermined event, from the computing device to the other computing device, a lock session signal for locking a communications session upon the occurrence of the predetermined event, the lock session signal configured to restrict access to the communications session until the computing device receives an unlock session signal from the other computing device;
        prompting a user at the computing device for identification information associated with the communications session;
        facilitating transmitting, from the computing device to the other computing device, the identification information; and
        facilitating receiving, at the computing device from the other computing device, the unlock session signal if the identification information is authenticated,
        wherein the predetermined event comprises a detection of a departure of the user without manual input from the user,
        wherein the computing device is configured to facilitate communication of the communications session using a first communication channel, and is configured to facilitate communication of the lock session signal, the unlock session signal, and the identification information using a second communication channel, and
        wherein communications occurring through the first communication channel are suspended when the communications session is locked.

2. The computing device of claim 1, wherein the second communication channel is a Citrix® Independent Computing Architecture™ (ICA) Virtual Channel.

3. The computing device of claim 1, wherein the predetermined event further comprises a lapse in a predetermined amount of time.

4. The computing device of claim 1, wherein the predetermined event further comprises an activation of a screen saver.

5. The computing device of claim 1, wherein the computing device is a personal computer.

6. The computing device of claim 1, wherein the computing device is an automated teller machine (ATM).

7. The computing device of claim 1, wherein the computing device is an industrial controller.

8. The computing device of claim 1, wherein the computing device is a gateway.

9. The computing device of claim 1, wherein the computing device is an internet protocol (IP) telephone.

10. The computing device of claim 1, wherein the computing device is a thin client.

11. The computing device of claim 1, wherein the computing device is a personal digital assistant (PDA).

12. The computing device of claim 1, wherein the computing device is a cellular telephone.

13. The computing device of claim 1, wherein the identification information is not a shared screen saver password.

14. The computing device of claim 1, wherein the computing device is configured to allow a session management operation to be triggered locally using an application at the computing device, but executed at the other computing device.

15. The computing device of claim 1, wherein the transmitting the lock session signal for the communications session comprises transmitting the lock session signal to lock the communications session at the other computing device.

16. The computing device of claim 1, wherein the computing device is configured to facilitate a local lock at the computing device and a session lock at the other computing device.

17. A non-transitory computer-readable medium or media encoded with instructions for facilitating management of a communications session, the instructions comprising code for:
    facilitating transmitting upon an occurrence of a predetermined event, from a computing device to another computing device that is remote to the computing device, a lock session signal for locking a communications session upon the occurrence of the predetermined event, the lock session signal configured to restrict access to the communications session until the computing device receives an unlock session signal from the other computing device;
    prompting a user at the computing device for identification information associated with the communications session;
    facilitating transmitting, from the computing device to the other computing device, the identification information; and
    facilitating receiving, at the computing device from the other computing device, the unlock session signal if the identification information is authenticated, wherein the predetermined event comprises a detection of a departure of the user without manual input from the user, wherein the computing device is configured to facilitate communication of the communications session using a first communication channel, and is configured to facilitate communication of the lock session signal, the unlock session signal, and the identification information using a second communication channel, and wherein communications occurring through the first communication channel are suspended when the communications session is locked.

18. A method for facilitating management of a communications session from a client computing device, comprising the steps of:

facilitating transmitting upon an occurrence of a predetermined event, from the client computing device to another computing device that is remote to the client computing device, a lock session signal for locking a communications session upon the occurrence of the predetermined event, the lock session signal configured to restrict access to the communications session until the client computing device receives an unlock session signal from the other computing device;

prompting a user at the client computing device for identification information associated with the communications session;

facilitating transmitting, from the client computing device to the other computing device, the identification information; and facilitating receiving, at the client computing device from the other computing device, the unlock session signal if the identification information is authenticated, wherein the predetermined event comprises a detection of a departure of the user without manual input from the user, wherein the client computing device is configured to facilitate communication of the communications session using a first communication channel, and is configured to facilitate communication of the lock session signal, the unlock session signal, and the identification information using a second communication channel, and wherein communications occurring through the first communication channel are suspended when the communications session is locked.

19. The computing device of claim 1, wherein the detection of the departure of the user without manual input from the user is performed using at least one of the following without manual input by the user indicating the departure: a motion detector, a presence or an absence of a dedicated short range communication identification device, or an altered biometric data of the user.

20. The computing device of claim 1, wherein the tasks further comprise receiving information about the user, and wherein the detection of the departure of the user without manual input from the user is performed by software configured to use artificial intelligence to examine input or writing style of another user.

* * * * *